(12) United States Patent
Heath et al.

(10) Patent No.: US 11,361,871 B2
(45) Date of Patent: Jun. 14, 2022

(54) COMPOSITION AND METHOD FOR THE PROCESSING OF HAZARDOUS SLUDGES AND ION EXCHANGE MEDIA

(71) Applicant: GeoRoc International, Inc., Chevy Chase, MD (US)

(72) Inventors: Paul George Heath, Sheffield (GB); Martin William Alexander Stewart, New South Wales (AU)

( * ) Notice: Subject to any disclaimer, the term of this patent is extended or adjusted under 35 U.S.C. 154(b) by 1011 days.

(21) Appl. No.: 15/897,337

(22) Filed: Feb. 15, 2018

(65) Prior Publication Data

US 2018/0233242 A1    Aug. 16, 2018

Related U.S. Application Data

(60) Provisional application No. 62/460,044, filed on Feb. 16, 2017.

(51) Int. Cl.
  *G21F 9/30* (2006.01)
  *C03C 14/00* (2006.01)
  *G21F 9/36* (2006.01)

(52) U.S. Cl.
  CPC ............ *G21F 9/305* (2013.01); *C03C 14/004* (2013.01); *G21F 9/302* (2013.01); *G21F 9/36* (2013.01); *C03C 2214/14* (2013.01)

(58) Field of Classification Search
  CPC ...... G21F 9/30; C03C 14/004; C03C 2214/14
  USPC .......................................................... 588/11
  See application file for complete search history.

(56) References Cited

U.S. PATENT DOCUMENTS 5,463,171 A  * 10/1995 Nishi ...................... G21F 9/008
                                                      588/14
2010/0172811 A1* 7/2010 Geniesse ............... C02F 1/5236
                                                      423/122

\* cited by examiner

*Primary Examiner* — Edward M Johnson
(74) *Attorney, Agent, or Firm* — Finnegan, Henderson, Farabow, Garrett & Dunner, LLP

(57) ABSTRACT

A composition to immobilize nuclear containing waste comprising at least one radioactive element or alloy of uranium, graphite, magnesium, and aluminum, and a method of using the same to immobilize the nuclear containing waste into a solid wasteform. The composition comprises at least one mineral phase forming element or compound for reacting with the at least one radioactive element or alloy. The composition further comprises at least one glass-forming element or compound to form a glass phase that will incorporate waste radioisotopes and impurities that do not react with the mineral phase forming element or compound.

36 Claims, No Drawings

COMPOSITION AND METHOD FOR THE PROCESSING OF HAZARDOUS SLUDGES AND ION EXCHANGE MEDIA

This application claims the benefit of priority to U.S. Provisional Application No. 62/460,044, filed Feb. 16, 2017, which is incorporated herein by reference in its entirety.

TECHNICAL FIELD

There is disclosed a composition of the wasteform to immobilize both magnox sludges and clinoptilolite wastes. There is also disclosed a method for the conditioning of both the magnox sludge and clinoptilolite type wastes in combination with the additives that enable these wasteforms to be made.

BACKGROUND

Magnox is a type of nuclear power/production reactor that was designed to run on natural uranium with graphite as the moderator and carbon dioxide gas as the heat exchange coolant. The name "Magnox" comes from the magnesium-aluminum alloy used to clad the fuel rods inside the reactor. Magnox, which is short for "magnesium non-oxidizing" has a major disadvantage in that it reacts with water, preventing long-term storage of spent fuel under water.

The current baseline method to treat Magnox Sludges and other radioactive sludges is to mix the sludge with a cement grout and cast it inside a container made from steel, such as stainless steel or iron. The cementation route increases the total waste volume, and thus is not ideal. Furthermore, this cemented Magnox sludge is unstable as it contains reactive metal, that leads to hydrogen production and the metal can also react to form expansive phases in the cement product, resulting in swelling of waste container. In addition, the durability of the cemented product is low compared to alternatives such as borosilicate glass or ceramics.

HIP technology has been proposed as a method for the immobilization of Magnox sludges and Clinoptilolite zeolite, including co-processing, and minimal process parameters. Vance et. al., Advantages hot isostatically pressed ceramic and glass-ceramic waste forms bring to the immobilization of challenging intermediate- and high level nuclear wastes, Advances in Science and Technology Vol. 73 (2010) pp 130-135).

Although the use of Hot-isostatic Press (HIP) technology has been proposed for the treatment of magnox sludge and/or clinoptilolite type wastes previously, at least two essential aspects were missing from these earlier disclosures. The first is the identification of a wasteform chemistry and thus the identification of additives able to safely immobilize the wide range of these wastes after HIPing. In addition, the technical processing challenges associated with treating the inherent hazards associated with these sludges has not been addressed in previous Hot-isostatic pressing (HIPing) disclosures. Namely, there is no disclosure teaching how to deal with flammable metals, or the generation and potential release of unwanted components including hydrogen, carbonates, organics, coarse components, or fine components. The second aspects were missing from these earlier disclosures is a lack of identification of a complete industrial-scale process which can safely and effectively treat the large volumes of these types of waste.

To solve the many needs described above, and overcome the mentioned deficiencies, the Inventors have developed compositions and methods to safely condition hazardous sludges and slurries for disposal. While the disclosure describes compositions and methods for magnox sludges and/or clinoptilolite type wastes, as found in magnox reactor sites in the United Kingdowm, the present disclosure is also relevant to other zeolitic ion-exchange materials used in the nuclear industry. Conditioning of the wastes is achieved by the addition of purpose designed additives coupled with the process to passivate the wastes to provide a stable wasteform for subsequent storage and disposal. Therefore, to address the many needs described above, the disclosure relates to the use of special chemical additives in combination with specific process steps, including hot-isostatic pressing as the final consolidation step.

SUMMARY

There is disclosed a composition to immobilize nuclear containing waste containing at least one radioactive element or alloy of uranium, graphite, magnesium, and aluminum. The composition comprises at least one mineral phase forming element or compound for reacting with the at least one radioactive element or alloy. The composition further comprises at least one glass-forming element or compound to form a glass phase that will incorporate waste radioisotopes and impurities that do not react with the mineral phase forming element or compound.

A method of using the disclosed composition to immobilize nuclear containing waste into a solid wasteform is also disclosed. In an embodiment, the method comprises: forming a slurry comprising nuclear containing waste; drying the slurry to form a dried product; calcining the dried product; loading the calcined product into a metal canister; evacuating and sealing the metal canister; and thermally treating the material in the metal canister to produce a dense waste form product.

It is to be understood that both the foregoing general description and the following detailed description are exemplary and explanatory only and are not restrictive of the invention, as claimed.

DETAILED DESCRIPTION OF THE INVENTION

The described composition and method can be used to treat hazardous and radioactive sludge, such as settling Pond Sludge including Magnox sludge. "Magnox sludge(s)" is defined as the waste by-product of a Magnox reactor, typically having a wet mud or a similar viscous mixture of liquid and solid components. The waste density is such sludge is typically 1.0-1.4 t/m$^3$, such as 1.2 t/m$^3$ as stored, and 0.6 to 0.8 t/m$^3$, such as 0.7 t/m$^3$ for dry settled sludge.

While the disclosed composition and method is described as being particularly beneficial for treating Magnox sludge, in the most basic sense the methods can be used to treat any thick, soft, wet mud or a similar viscous mixture of liquid and solid components, especially containing unwanted radioactive or hazardous materials.

One embodiment of the present disclosure is directed to the composition of the wasteform to immobilize waste from magnox reactors, such as magnox sludges and clinoptilolite wastes. The wasteform from such reactors behaves comparatively to high-level waste (HLW) glass wasteforms in aqueous durability testing, while using cheap readily available starting materials. The composition of wasteforms for magnox sludges relate to glass-bonded magnesium silicate/Magnesium titanate matrix. In this case the invention covers addition of calcined magnox sludge at 40 wt %-100 wt % (or the aqueous slurry equivalent) with clinoptilolite (or other zeolitic minerals), silicate minerals, $SiO_2$, $TiO_2$, phosphate, alumina-borosilicate glass, borosilicate glass, silicotitanate glass, iron-phosphate glass, phosphate glass or a combination of these additives.

Further additions of lithium oxide, lithium fluoride, calcium fluoride, sodium fluoride, sodium fluorosilicate or other flux, at up to 5 weight % to assist melting may also be used. In addition, titanium, nickel, nickel alloy, iron steel or stainless steel metal powders at up to 10 wt % are also added to control redox conditions in the sludge during HIPing. These are particularly important for the control of the uranium oxide state in the wasteform. Clinoptilolite or other zeolites may also be processed at 100 wt % loading to produce a vitreous wasteform.

The waste components are physically diverse and may contain a coarse fraction and a fine fraction of particulates. The relative amounts of each of these size components can vary from 10-90% depending on the source of the sludge. As used herein, "fine" fractions are intended to be submicron, such as less than 200 µm. In one embodiment, fine fractions range from 0.1 to less than 200 µm, such as 0.5 to 150 µm, or even 1.0 to 100 µm. In one embodiment, the waste components comprise fine fractions that contain colloidal precipitates in equilibrium.

As used herein, "coarse" fractions are intended to be 200 µm or greater. In one embodiment, coarse fractions range from 200 µm to 6 mm, such as 500 µm to 4 mm, or even 750 µm to 2 mm. In one embodiment, a majority of the coarse fractions have particulate sizes ranging from 200 µm to 6 mm and a majority of the fine fractions have particulate sizes ranging from 0.1 to less than 200 µm.

In the present disclosure, there is described a process that changes the targeted phases such that a high waste loading can be achieved with the durability remaining high. For example, in the process the sludge is calcined such that the main component magnesium metal, carbonate or hydroxide is converted to the oxide form or as a component of oxide-minerals. Non-limiting examples of such oxides include:

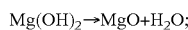

$Mg(OH)_2 \rightarrow MgO + H_2O;$

$MgCO_3 \rightarrow MgO + CO_2;$ and

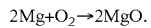

$2Mg + O_2 \rightarrow 2MgO.$

In other embodiments, uranium metal and/or hydrated and carbonated uranium oxides and other significant uranium components are converted to a uranium oxide forms or a component of oxide mineral phases.

In various embodiments, the drying and calcination stages remove hydrogen and free water, chemically bound water from the wasteform, making a much more stable product for storage and final disposition than a cementitious route. In a cementitious route hydrogen and hydrogen generating reactive metals remain in the wasteform. Further thermal processing densifies the product to closed porosity (>92% theoretical density) and forms chemical phases and a morphology suitable for long-term storage.

In one embodiment, the thermal treatment described herein comprises hot-isostatic pressing. The HIP process is generally described in more detail in U.S. Pat. No. 8,754,282, which is herein incorporated by reference in its entirety. More specifically, as described in this patent, the HIP consists of a pressure vessel surrounding an insulated resistance-heated furnace. Treating radioactive calcine with the HIP involves filling the container with the waste materials, here the contaminated ion exchange media. The container is evacuated and placed into the HIP furnace and the vessel is closed, heated, and pressurized. The pressure is typically provided via argon gas, which, at pressure, also is an efficient conductor of heat. The combination of heat and pressure consolidates and immobilizes the waste into a dense monolith.

In an embodiment, the HIP will process one can at a time to a temperature, such as a temperature ranging from of about 800° C. to 1400° C., such as 900° C. to 1300° C. at a processing pressure ranging up to 300 MPa, such as 5 to 150 MPa. The cycle time to process a HIP can ranges up to 16 hours, such as from about 10-16 hours. Once removed from the HIP, the can will be allowed to cool to ambient temperature prior to being loaded into a disposal canister. The HIP temperature may also be modified depending on the waste. Various changes in HIP conditions such as temperatures, pressures, and atmospheres depending on the material being consolidated are discussed in U.S. Pat. Nos. 5,997,273 and 5,139,720, which are herein incorporated by reference.

In one embodiment, there is described a method of reacting a small sub <250 um particle sized magnesium-derived component with the additives during the thermal treatment stages calcination and final consolidation. This is achieved by the intermixing of the fine components of the waste with fine additives that provide sources of Ti, Si, P or Al, such as titania, alumina, phosphate, silica and glass frit, to form stable phases.

Non-limiting examples of such stable phases for titanate include:

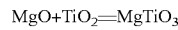

$MgO + TiO_2 = MgTiO_3$

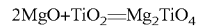

$2MgO + TiO_2 = Mg_2TiO_4$

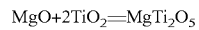

$MgO + 2TiO_2 = MgTi_2O_5$

Non-limiting examples of such stable phases for silicate include:

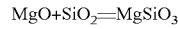

$MgO + SiO_2 = MgSiO_3$

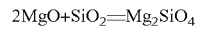

$2MgO + SiO_2 = Mg_2SiO_4$

A non-limiting example of such stable phases for aluminate includes: $MgO + Al_2O_3 = MgAl_2O_4$.

In one embodiment, the phases higher in Mg are particularly described phases.

In other embodiments, ternary multicomponent phases may also be present, such as from other elements in the waste, including diopside—$CaMgSi_2O_6$ and perovskite $CaTiO_3$, formed when calcium is present.

The larger sized waste components form MgO grains that are protected by encapsulation in other phase including a silicate glass that is formed from the addition of clinoptilolite, other zeolites, silica, high-silicate minerals or glass frit.

The uranium in the sludge is oxidized in the process to form uranium oxide, including $UO_2$ or $UO_{2+x}$; or reacts with the additives to form a titanate mineral brannerite, pyrochlore, zirconolite. In an embodiment, these may be encapsulated in the matrix.

The final waste form is therefore a mixture of MgO and other ceramic phases encapsulated in a protective glass plus ceramic phase matrix. The ability to encapsulate MgO enables high waste loadings (>40 wt %) and protects the MgO from hydration during long-term storage and once disposed in a geological repository.

In one embodiment, impurities and fission products present in the waste are incorporated into the phases discussed above or into the glass.

Another embodiment of the present disclosure is directed to the process for the conditioning of both the magnox sludge and clinoptilolite type wastes in combination with the additives that enable these wasteforms to be made. In an embodiment, the correct wasteform chemistry and morphology is achieved by processing of the wastes as described below:

Slurry mixing: in an embodiment, mixing may utilize paddle type mixing, recirculating mixing, in-line mixing, turbulent slurry mixing or a combination of the above.

Drying: in an embodiment, drying is performed using a method whereby granulation occurs concurrently with moisture removal such as wiped or thin-film evaporation, rotary drying or conical mixer/wiper method. However alternative methods may also be utilized including, spray drying, fluidized bed drying or flash drying. Drying also removes any hydrogen present in the waste.

Granulation: If required, granulation using roll compaction is utilized after drying to produce a granular product.

Calcination: in an embodiment, bound water, carbonates and organics present in the waste can be removed using a calcination methodology such as rotary calcination, vibratory calcination, fluidized bed calcination or a batch calcination method. The calcination step also serves to passivate the reactive metal component of the waste allowing it to react with the additives and become part of a stable wasteform.

Loading and packing of a metal hot-isostatic press of hot-press canister/can, with or without vibratory or tamping to improve packing, such as under a dry atmosphere or vacuum.

Evacuation and sealing of the metal canister.

Thermal treatment to produce a dense waste form product, which may comprise a glass-ceramic enclosed in a metal can. This can be done using either, hot-isostatic pressing, hot pressing (in a bellows or die). It could also be done via sintering of a pellet/puck/block. An example of HIP processing conditions canister occurs at temperatures between 900° C. and 1300° C. and pressures of 5 MPa to 150 MPa. In an embodiment, conditions range from 900° C. and 1050° C., above this an excess of less durable phases form and the glass forming components are consumed to form these less durable phases (magnesium silicates).

In one embodiment, one or more additives are provided, as shown in Table 1.

TABLE 1

Additive Components added at 0-60 wt %

| Component | Silicate-rich | Titanate-rich | Silicate plus titanate | Aluminate |
|---|---|---|---|---|
| Clinoptilolite or similar zeolite mineral | 0-100 | 0-50 | 20-60 | 0-30 |
| TiO$_2$ Titanium dioxide | 0-10 | 50-95 | 10-60 | 0-10 |
| Alumina | 0-10 | | 0-5 | 50-90 |
| Silica | 0-100 | 0-30 | 20-50 | 0-30 |
| Silicate glass frits | 0-100 | 0-50 | 20-60 | 0-50 |

Compositions

In one embodiment, the wasteform compositions are formed during the process and are targeted to increase the durability of the formed wasteform over that of the waste itself or current baseline cementation processes. Additives are mixed with the waste either at the front-end or downstream. These chemical additives react with the waste ions to form target mineral phases in the wasteform structure. All of the compositions contain a glass phase. This glass phase bonds the wasteform and encapsulates the phases. The glass phase is there to incorporate waste radioisotopes and impurities that are not taken up by the mineral phases. In one embodiment, the disclosed method is used to incorporate radioactive caesium isotopes, which along with strontium-90 make up the bulk of the radioactivity and heat generated in waste derived from the nuclear fuel used in power operations.

Target mineral phase systems are mainly a combination of titanate, silicate and aluminate phases, plus a silicate glass phase. For high waste loadings the composition contains residual magnesium oxide (MgO) encased in a silicate phase and a silicate glass.

In one embodiment, there is described the use of zeolites in the described slurry. The use of Clinoptilolite or other zeolite materials in the waste additive compositions serves at least two purposes. One is to provide the silica needed to make a glass or the silicate phases and the other is to capture any free caesium and other isotopes in the front end and bind them tightly so as to significantly reduce volatile losses during the calcination stage.

The described compositions and methods can be used to clean up settling pond sludge surrounding nuclear Decommissioning sites. In these environments, the main source is from fuel corrosion and the nuclides involved include Cs, Eu, Ru, Sr-90 and other mixed fission products and actinides. Uranium is another major radioactive component in Magnox Sludges, which may be immobilized by a method described below.

The wastes described herein may be reacted with the inventive composition to form crystalline phases, including pyrochlore, zirconolite and brannerite titanates; uranate phases such as MgUO$_4$, MgUO$_{3.8}$, MgU$_3$O$_{10}$. These crystalline phases can then be incorporated into a silicate glass structure, as described herein. In this embodiment, Uranium can be left as residual uranium oxide, nominally, UO$_2$ or UO$_{2\pm x}$.

Titanate Systems

In one embodiment, titanates may provide a host phase for uranium and actinides, fission products and impurities present in wastes, including potentially toxic metals such as lead. The bulk of the sludge contains Mg, typically present as Mg(OH)$_2$, MgO, MgCO$_3$ or Mg metal is reacted during the process=MgTiO$_3$, Mg$_2$TiO$_4$, MgTi$_2$O$_5$ $$MgO + TiO_2 = MgTiO_3$$

$$2MgO + TiO_2 = Mg_2TiO_4$$

$$MgO + 2TiO_2 = MgTi_2O_5$$

For any Ca impurity in the sludge and Sr fission product radioisotope perovskite can form, nominally, CaTiO$_3$—SrTiO$_3$, [(Ca,Sr)TiO$_3$]. This phase can also incorporate other fission products and impurities into its structure.

Uranium that is present in the sludge in the sludge can react with titanium oxide and other components to form:

Pyrochlore nominally A$_2$B$_2$O$_{7-x}$, were A is nominally U, Th, actinides, Ca, rare earths, Y Ti$^{3+}$; and B is nominally Ti, Al, Zr, Mg and transition metals. Cl can be accommodated on the O site. Traces of fission products may also be found in the structure.

Brannerite nominally $UTi_2O_6$ but with Ca, rare earths, Zr, Y, Th and other fission products substituted for U; and Zr, Mg, Al, Ru, and transition metals such as Fe, Ni, Cr, Tc and other fission products substituted for Ti.

Zirconolite nominally $ACB_2O_{7-x}$, were A is nominally Ca with U, Th, actinides, rare earths, Y as possible substitutions, C is nominally Zr with Hf, U, Th, rare earth, $Ti^{3+}$; and B is nominally Ti, Al, Zr, Mg and transition metals such as Fe, Cr and Ni. Cl can be accommodated on the O site. Traces of fission products may also be found in the structure.

Titanium dioxide is also present as a catalyst for assisting in the decomposition of salts, nitrates, organics and hydrocarbons during processing, in particular during calcination.

Silicate

In one embodiment, the addition of silica as silicon oxide (quartz, cristobalite), a silica sol, a glass frit, or a zeolite or other silicate mineral to form a wasteform substantially composed of magnesium silicate and silicate glass is another route that has been shown to produce dense durable wasteforms. The target phase is forsterite ($Mg_2SiO_4$) but the wasteform system can also include and $MgSiO_3$ (enstatite) and $CaMgSi_2O_6$ phases. Some Mg can also be incorporated into the silicate glass phase, which bonds the mineral phases. In these systems MgO can also be present, which is encapsulated by the mineral silicates and glass phases. To obtain a high waste loading, wastes have been processed with additives in a way such that a coarse fraction of MgO remains. The coarse fraction is encapsulated in the glass-mineral phases in the wasteform. This is achieved by firstly restricting the amount of particle size reduction that occurs in the front-end mixing stage, calcining the waste plus additives to form MgO grains and then limiting the consolidation temperature to 900-1050° C. to retain the desired mineralogy and morphology in the wasteform.

Aluminate

In one embodiment, Mg is accommodated in a spinel ($MgAl_2O_4$), some impurities such as Fe, Cr Ni, etc. may also be present in the spinel structure. In this system silica or silicate additions are added to form a glass bonding phase that incorporates the fission products and other ions in the waste sludge.

Multicomponent Systems

In various embodiments, multicomponent systems may be used. Non-limiting examples of such systems include: titanate+silicate+aluminate; titanate+silicate; silicate+aluminate; titanate+aluminate phase combinations have been shown to be more flexible. In one embodiment, dense, durable titanate plus silicate systems bonded with a silicate glass have been made and these form stable, durable wasteforms.

Additional Additives

The use of a number of additives as redox control agents and mineralizers have been tested. These include the use of titanium, nickel and inconel powders to maintain reducing conditions during HIPing and act as a potential sink for volatile species during reaction. Wollastonite and cryolite have also been used as mineralizers to aid in the formation of glass ceramics. These additives have been tested individually and in combination at up to 10 wt % in the compositions outlined in Table 2.

TABLE 2

| Reagent (wt %-calcined) | Planned (P) CPS | Magnox sludge Simulant | Waste Simulant Clinoptilolite/sand (9:1) | $TiO_2$ | Glass frit | Silica sand | Inactive Clino |
|---|---|---|---|---|---|---|---|
| #1 | | 60 | — | 30 | 10 | — | — |
| #2 | | 60 | 15 | 15 | 10 | — | — |
| #3 | | 60 | — | 15 | 25 | — | — |
| #4 | | 60 | 30 | — | 10 | — | — |
| #5 | | 60 | 15 | — | 25 | — | — |
| #6 | | 60 | — | — | 40 | — | — |
| #7 | — | 60 | 20 | 10 | 10 | — | — |
| #8 | — | 40 | 40 | 20 | — | — | — |
| #9 | — | — | 100 | | | | — |
| #10 | | 45 | — | 45 | 10 | | |
| #11 | | 60 | — | 30 | 10 | | |
| #12 | | 35 | 20 | 35 | 10 | | |
| #13 | P | 40 | TBC | TBC | TBC | TBC | — |
| #14 | P | 80 | TBC | TBC | TBC | TBC | — |
| #16 | P | 100 | — | — | — | — | — |
| #17 | P | — | 100 | — | — | — | — |
| #18 | | 50 | 30 | — | 20 | — | — |
| #19 | | 60 | 20 | — | 20 | — | — |
| #20 | | 60 | 20 | 20 | — | — | — |
| #21 | | 60 | 20 | — | 12 | — | 8 |
| #22 | CPS | 60 | 15 | 15 | 10 | — | — |
| #23 | CPS | 40 | — | 40 | 20 | — | — |
| #24 | CPS | 40 | — | — | — | 60 | — |
| #25 | CPS | 57 | — | — | — | 43 | — |
| #26 | CPS | 66 | — | — | — | 33 | — |
| #27 | CPS | 40 | — | 66 | — | — | — |
| #28 | CPS | 57 | — | 50 | — | — | — |
| #29 | CPS | 66 | — | 40 | — | — | — |
| #30 | CPS | 40 | 75 | — | — | — | — |
| #31 | CPS | 57 | 50 | — | — | — | — |
| #32 | CPS | 66 | 25 | — | — | — | — |
| #33 | CPS | 50 | 25 | 25 | — | — | — |
| #34 | CPS | 60 | 20 | 20 | — | — | — |
| ##35 | CPS | 70 | 15 | 15 | — | — | — |

In various embodiment, additional densification aids such as lithium salts, lithium silicate, sodium salts, sodium silicates and fluorides (such as sodium fluorosilicate flux), and calcium fluoride added as individual components or as part of a frit, may be used, as they may aid in densification.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A composition to immobilize nuclear containing waste containing at least one radioactive element or alloy of uranium, graphite, magnesium, and aluminum, said composition comprising:
   at least one mineral phase forming element or compound that reacts with said at least one radioactive element or alloy; and
   at least one glass-forming element or compound to form a glass phase that incorporates waste radioisotopes and impurities that do not react with said least one mineral phase forming element or compound,
   wherein the composition immobilizes said nuclear containing waste in a solid wasteform,
   wherein the nuclear containing waste comprises a magnesium metal, carbonate or hydroxide, and the mineral phase is sufficient to convert the magnesium metal, carbonate or hydroxide to MgO, and/or the nuclear containing waste comprises a uranium metal and/or hydrated and carbonated uranium, and the mineral phase is sufficient to convert the uranium oxide.

2. The composition of claim 1, wherein nuclear containing waste comprises magnox sludges, clinoptilolite wastes, and combinations thereof.

3. The composition of claim 1, wherein the final wasteform has a density of greater than 90% theoretical density.

4. The composition of claim 1, wherein the magnesium has a magnesium-derived component with a particle size <250 μm.

5. The composition of claim 1, further comprising at least one additive to assist in the thermal treatment and consolidation of the final wasteform.

6. The composition of claim 5, wherein the at least one additive comprises a source of Ti, Si, P or Al, that react with the magnesium component to form stable phases.

7. The composition of claim 6, wherein the sources of Ti, Si, P or Al include titania, titanate minerals, alumina, phosphate silica, silicate minerals, silica sol and glass frit.

8. The composition of claim 6, wherein the stable phases comprise $MgTiO_3$, $Mg_2TiO_4$, $MgTi_2O_5$, $MgSiO_3$, $Mg_2SiO_4$, $MgAl_2O_4$, and combinations thereof.

9. The composition of claim 6, further comprising ternary multicomponent phases from other elements in the waste.

10. The composition of claim 9, wherein the ternary multicomponent phases comprise diopside ($CaMgSi_2O_6$) and perovskite ($CaTiO_3$).

11. The composition of claim 1, wherein the wasteform comprises a mixture of MgO and other ceramic phases encapsulated in a protective glass plus ceramic phase matrix.

12. The composition of claim 1, wherein the wasteform comprises a uranium oxide or a compound selected from a titanate mineral: brannerite, pyrochlore, zirconolite encapsulated in a matrix.

13. The composition of claim 1, wherein the nuclear containing waste contains both coarse fraction and fine fractions of particulates in a ratio ranging from 10:90 to 90:10.

14. The composition of claim 13, wherein a majority of the coarse fractions have particulate sizes ranging from 200 μm to 6 mm and a majority of the fine fractions have particulate sizes ranging from 0.1 to less than 200 μm.

15. A method of treating nuclear containing waste, said method comprising:
   forming a slurry comprising nuclear containing waste containing a magnesium metal, carbonate or hydroxide and a composition comprising at least one mineral phase forming element or compound and at least one glass-forming element or compound, wherein the mineral phase is sufficient to convert the magnesium metal, carbonate or hydroxide to MgO, and/or the nuclear containing waste comprises a uranium metal and/or hydrated and carbonated uranium, and the mineral phase is sufficient to convert the uranium oxide;
   drying said slurry to form a dried product;
   calcining the dried product to form a calcined product;
   loading the calcined product into a canister;
   evacuating and sealing the metal canister; and
   thermally treating the calcined product in the canister to produce a dense wasteform product, which comprises a glass-ceramic.

16. The method of claim 15, further comprising mixing said slurry using at least one paddle type mixing, recirculating mixing, in-line mixing, turbulent slurry mixing or a combination thereof.

17. The method of claim 15, wherein drying the slurry is performed concurrently with a step that granulates the resulting product, said drying comprises at least one process selected from wipe or thin-film evaporation, rotary drying or conical mixer drying, spray drying, fluidized bed drying or flash drying.

18. The method of claim 15, wherein hot-isostatic pressing occurs at temperatures ranging from 900° C. and 1300° C. and pressures ranging from 5 MPa to 150 MPa.

19. The method of claim 15, wherein calcining occurs using a rotary calcination, vibratory calcination, fluidized bed calcination or a batch calcination method.

20. The method of claim 15, wherein calcining removes hydrogen and/or reactive water from the wasteform.

21. The method of claim 15, further comprising thermal processing to densify the product to greater than 90% theoretical density.

22. The method of claim 15, further comprising reacting a magnesium-derived component having a particle size less than 250 μm with at least one additive to assist in the thermal treatment and consolidation of the dense waste form product.

23. The method of claim 21, wherein said reacting comprises the intermixing of fine components of the waste with fine additives that provide sources of Ti, Si, P or Al, to form at least one stable phase.

24. The method of claim 23, wherein the sources of Ti, Si, P or Al include titania, alumina, phosphate silica, and glass frit.

25. The method of claim 23, wherein the at least one stable phase comprises $MgTiO_3$, $Mg_2TiO_4$, $MgTi_2O_5$, $MgSiO_3$, $Mg_2SiO_4$, $MgAl_2O_4$, and combinations thereof.

26. The method of claim 23, further comprising ternary multicomponent phases from other elements in the waste.

27. The method of claim 26, wherein the ternary multicomponent phases comprise diopside ($CaMgSi_2O_6$), perovskite ($CaTiO_3$) and mixtures thereof.

28. The method of claim 15, wherein the dense wasteform product comprises a mixture of MgO and at least one other ceramic phase encapsulated in a protective glass plus ceramic phase matrix.

29. The method of claim 15, wherein the dense wasteform product comprises a uranium oxide and at least compound selected from a titanate mineral brannerite, pyrochlore, zirconolite encapsulated in a matrix.

30. The method of claim 15, wherein the at least one glass-forming element or compound comprises a zeolite.

31. The method of claim 30, wherein the zeolite comprises clinoptilolite, which is found in an amount to adsorb the volatile elements and isotopes thereof, to form a glass during processing that contains radioactive ions present in the waste, or both, such that their loss rate during thermal processing is reduced.

32. The method of claim 30, wherein the volatile elements and isotopes thereof comprise Cs.

33. The method of claim 30, wherein the zeolite reacts to form a glass during processing that contains radioactive ions present in the waste.

34. The method of claim 15, further comprising vibratory packing the calcined material prior to thermally treating.

35. The method of claim 34, wherein the canister is made of a metal, and thermally treating the metal material canister comprises hot isostatic pressing.

36. The method of claim 15, further comprising granulating the dried product.

* * * * *